US006930738B1

(12) United States Patent
Kaneko et al.

(10) Patent No.: US 6,930,738 B1
(45) Date of Patent: Aug. 16, 2005

(54) LIQUID CRYSTAL DISPLAY WITH PARTICULAR REFLECTIVE SWITCHED STATES

(75) Inventors: Yasushi Kaneko, Sayama (JP); Takashi Akiyama, Sayama (JP); Masafumi Ide, Tokorozawa (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/269,503

(22) PCT Filed: Jul. 30, 1998

(86) PCT No.: PCT/JP98/03409

§ 371 (c)(1),
(2), (4) Date: Mar. 29, 1999

(87) PCT Pub. No.: WO99/06878

PCT Pub. Date: Feb. 11, 1999

(30) Foreign Application Priority Data

Jul. 30, 1997 (JP) .................. 9-204418

(51) Int. Cl.$^7$ ......................................... G02F 1/1335
(52) U.S. Cl. ..................................... 349/113; 349/114
(58) Field of Search ........................ 359/487, 497, 359/498; 428/1, 220; 349/113, 168, 118, 349/114; 350/334

(56) References Cited

U.S. PATENT DOCUMENTS 4,697,885 A * 10/1987 Minowa et al. ............. 350/334
5,194,975 A    3/1993 Akatsuka et al. ............. 359/73
5,400,158 A *  3/1995 Ohnishi et al. .............. 349/119
5,440,413 A *  8/1995 Kikuchi et al. ............... 359/73
5,528,400 A *  6/1996 Arakawa ...................... 359/73
5,576,077 A * 11/1996 Bosma et al. ................... 428/1
5,587,821 A * 12/1996 Nakanishi et al. .......... 349/118
5,847,798 A * 12/1998 Yang et al. .................. 349/169
5,867,240 A *  2/1999 Crawford et al. ........... 349/118
5,990,995 A * 11/1999 Ebihara et al. .............. 349/113
6,124,971 A *  9/2000 Ouderkirk et al. .......... 359/487

FOREIGN PATENT DOCUMENTS

EP    0 246 842   11/1987
GB    2 307 562    5/1997

(Continued)

Primary Examiner—Frank G. Font
Assistant Examiner—Timothy Rude
(74) Attorney, Agent, or Firm—Westerman, Hattori, Daniels & Adrian, LLP (57) ABSTRACT

A liquid crystal display device is made by disposing an STN cell (16) in which nematic liquid crystal (6) having a twist angle in the range from 180° to 270° is filled and sandwiched between a first substrate (1) having a first electrode (3) and a second substrate (2) having a second electrode (4) at the center, providing a retardation film (13) and an absorption-type polarizing film (8) outside the second substrate (2) in order, and providing a reflection-type polarizing film (10) and a light absorbing film (11) outside the first substrate (1) in order. This enables a metallic silver background due to the reflected light by the reflection-type polarizing film (10) and display in black or in color by light passing through the reflection-type polarizing film (10) being absorbed in the light absorbing film (11) or only light of specific color being reflected.

8 Claims, 11 Drawing Sheets

FOREIGN PATENT DOCUMENTS

| | | |
|---|---|---|
| JP | 61-147720 | 8/1985 |
| JP | 61-103185 | 5/1986 |
| JP | 64-3825 | 1/1989 |
| JP | 2-62513 | 3/1990 |
| JP | 4-3020 | 1/1992 |
| JP | 4-218025 | 8/1992 |
| JP | 4-320213 | 11/1992 |
| JP | 10-3078 | 1/1998 |
| WO | WO 95/17692 | 6/1995 |
| WO | 97/01788 | 1/1997 |
| WO | WO 97/01789 | 1/1997 |

* cited by examiner

LIQUID CRYSTAL DISPLAY WITH PARTICULAR REFLECTIVE SWITCHED STATES

TECHNICAL FIELD

The present invention relates to a liquid crystal display device, particularly to a monochromatic color liquid crystal display device in which a background portion of a display and a display portion of letters, figures and the like are colored.

BACKGROUND TECHNOLOGY

Conventionally, several means have been proposed for a monochromatic color liquid crystal display device of which a background portion of a display and a display portion of letters, figures and the like are colored in a liquid crystal display device.

The first conventional art is a monochromatic color liquid crystal display device in which a color polarizing film is provided outside a liquid crystal display panel, which is simple in structure and generally used.

The second conventional art is a monochromatic color liquid crystal display device in which nematic liquid crystal in a liquid crystal cell forming a liquid crystal display panel is mixed with a dichromatic pigment which is allowed to move together with the movement of the nematic liquid crystal molecules, which is referred to as a guest-host scheme.

However, in any one of the conventional monochromatic color liquid crystal display devices, letters and figures colored with a dye or a dichroic pigment are displayed in a white background, or conversely, white letters and white figures are displayed in a background colored with a dye or a dichroic pigment, which makes the contrast thereof low. Furthermore, the number of the dyes or the dichroic pigments is limited, which causes a disadvantage in that the number of colors usable for displaying is limited.

Additionally, a liquid crystal display device which is suitable for colorful designs, capable of a metallic display, and excellent in a visible angle characteristic is required for a digital watch or a portable telephone.

The present invention is invented in view of the present situation and its object is to provide a liquid crystal display device in which color letters and color figures are displayed in a metallic background, or conversely, metallic letters and figures are displayed in a colorful background, and thereby a display with high contrast and richness in designs is possible, and the viewing angle characteristic is also excellent.

DISCLOSURE OF THE INVENTION

In order to achieve the above objects, the liquid crystal display device according to the present invention is made as described hereinafter.

In the liquid crystal display device, used is a super twisted nematic (STN) liquid crystal cell which is made by filling and sandwiching nematic liquid crystal, having a twist angle in the range from 180° to 270°, between a transparent first substrate having a first electrode and a transparent second substrate having a second electrode.

A retardation film is provided outside the second substrate of the STN liquid crystal cell and an absorption-type polarizing film which absorbs the light linearly polarized in the direction orthogonal to the transmission axis thereof is provided outside the retardation film. Furthermore, a reflection-type polarizing film which reflects the light linearly polarized in the direction orthogonal to the transmission axis thereof is provided outside the first substrate of the STN liquid crystal cell described above and a light absorbing member is provided outside the reflection-type polarizing film.

As the retardation film, used is a retardation film having relations of nx>nz>ny, where nx is the refractive index in the direction of the phase delay axis, ny is the refractive index in the Y-axis direction, and nz is the refractive index in the thickness direction.

Alternatively, a twisted retardation film is provided outside the second substrate of the STN liquid crystal cell and the absorption-type polarizing film is provided outside the twisted retardation film, and the reflection-type polarizing film and the light absorbing member may be provided outside the first substrate of the STN liquid crystal cell, in order.

Preferably, in the liquid crystal display devices, a light diffusion layer may be provided on the outside surface of the absorption-type polarizing film or a light diffusion sheet may be provided outside the absorption-type polarizing film.

The absorption-type polarizing film can be a color retardation film using a dichroic pigment.

The light absorbing member can be a color filter or a solar cell.

Alternatively, the light absorbing member can be a translucent absorbing member and a back light can be provided outside the translucent absorbing member.

A light diffusion layer can be also provided between the first substrate of the STN liquid crystal cell and the reflection-type polarizing film.

Through the above configuration, in the liquid crystal display device according to the present invention, a metallic silver background due to the light reflected by the reflection-type polarizing film and display in black or in color with excellent contrast by means of light passing through the reflection-type polarizing film being absorbed in the light absorbing member or only light of specific color being reflected are possible. Note that the detailed operations will be described in the embodiments of the present invention.

BEST MODE FOR CARRYING OUT THE INVENTION

The best mode for carrying out a liquid crystal display device according to the present invention will be described hereinafter with reference to the drawings.

First Embodiment: FIG. 1 to FIG. 4

Figure 1:
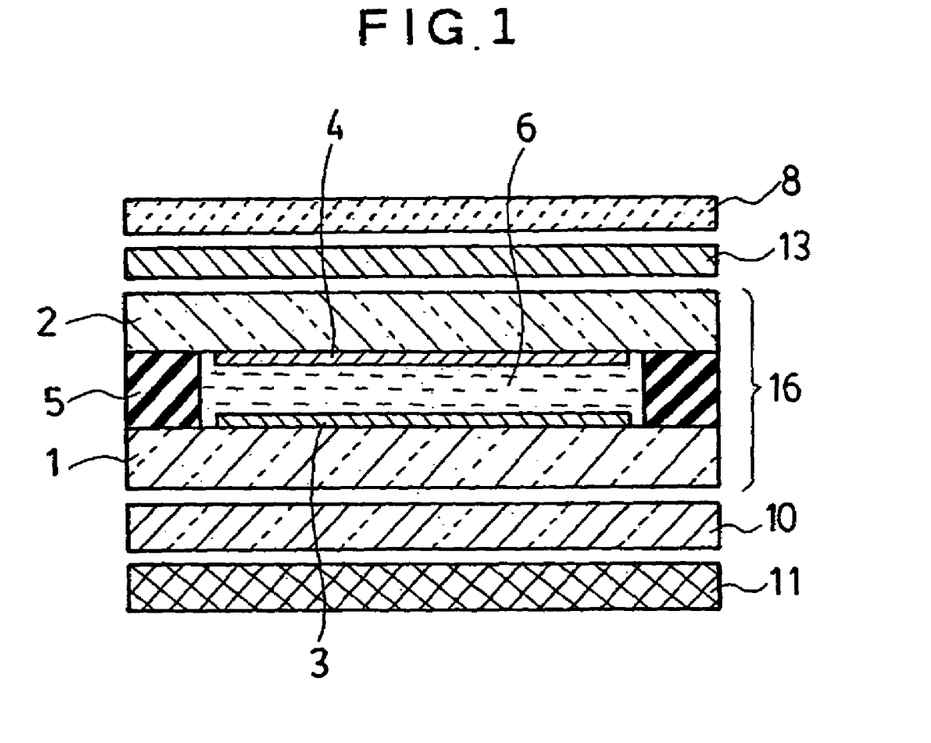
FIG. 1 is a schematic cross-sectional view showing a structure of a first embodiment of a liquid crystal display device according to the present invention.
Figure 2:
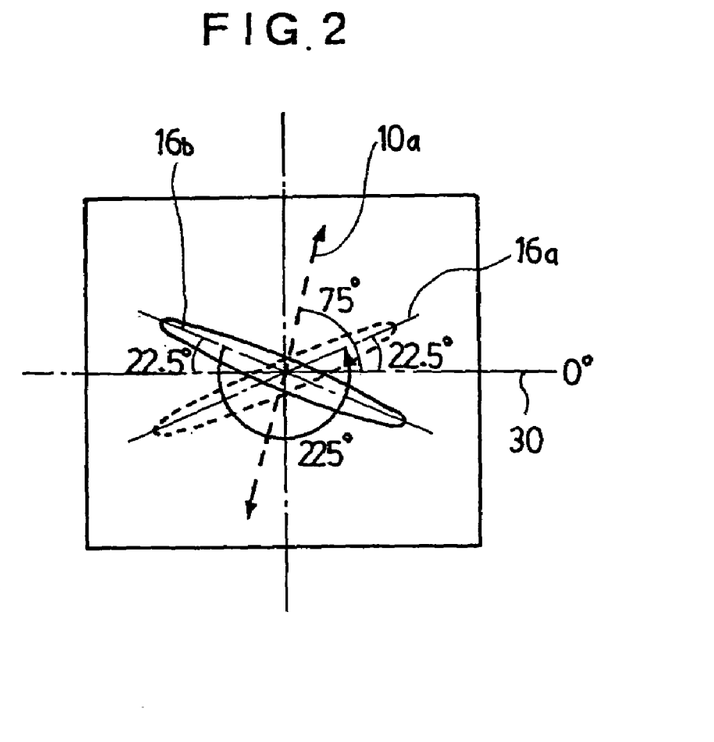
FIGS. 2 and 3 are plane views showing positional relations of axes of the liquid crystal display device.
Figure 3:
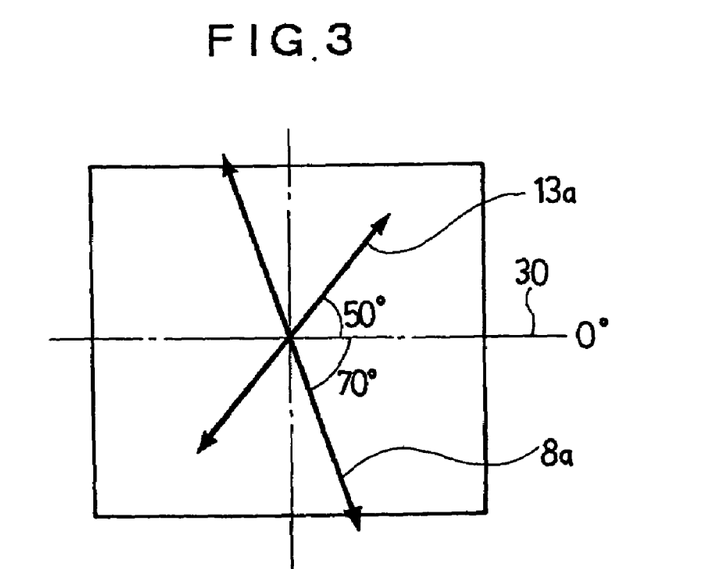

The first embodiment of the liquid crystal display device according to the present invention will be explained first with reference to FIG. 1 to FIG. 4. FIG. 1 is a schematic cross-sectional view showing a structure of the liquid crystal display device, in which the thickness of members and the gaps between thereof are shown substantially enlarged. FIGS. 2 and 3 are plane views showing positional relations of each axis of the components.

The liquid crystal display device is structured, as shown in FIG. 1, in such a manner that a first substrate 1 and a second substrate 2, which are both made of glass plates with a thickness of 0.5 mm, are adhered to each other through a sealing member 5 provided at the periphery thereof, and nematic liquid crystal 6 which is aligned at a twist angle of 225° is filled and sandwiched in a gap between the pair of the substrates 1 and 2 to form a super twisted nematic (STN) liquid crystal cell 16. On the inner side of the first substrate 1, a transparent first electrode 3 is formed with Indium Tin oxide (ITO) and on the inner side of the second substrate 2, a transparent second electrode 4 is also formed with ITO.

One of the first and second electrodes 3 and 4 is a display electrode, which is formed into a display pattern, or a pattern (matrix) of segments or dots (pixels). The other is a counter electrode, which is formed into a common whole surface pattern or a belt-shaped pattern in lines or rows.

On the surfaces of both the first electrode 3 and the second electrode 4, formed is an alignment film (not shown).

As shown in FIG. 2, on the first substrate 1 side, a rubbing treatment is performed so that a lower molecular alignment direction 16a of liquid crystal of the nematic liquid crystal 6 is disposed in the direction rotated 22.5° counterclockwise with respect to a horizontal axis 30 (0°). On the second substrate 2 side, a rubbing treatment is performed so that an upper molecular alignment direction 16b of liquid crystal of the nematic liquid crystal 6 is disposed in the direction rotated 22.5° clockwise with respect to the horizontal axis 30 (0°). Through the above structure, formed is the STN liquid crystal cell 16 in which the twisted alignment angle of the nematic liquid crystal 6 is 225° counterclockwise seen from the second substrate 2 side.

A difference $\Delta n$ in birefiingence of the nematic liquid crystal 6 used for the STN liquid crystal cell 16 is set to be 0.15 and a cell gap d which is a gap between the first substrate 1 and the second substrate 2 is set to be 5.5 $\mu$m. Accordingly, a $\Delta n d$ value of the STN liquid crystal cell 16 which is represented by the product of the difference $\Delta n$ in the birefringence of the nematic liquid crystal 6 and the cell gap d is 825 nm. A twisted pitch of the nematic liquid crystal 6 is adjusted to 11 $\mu$m.

A retardation film 13 is provided outside (on the visible side of) the second substrate 2 of the STN liquid crystal cell 16 and an absorption-type polarizing film 8 is provided outside the retardation film 13. Furthermore, a reflection-type polarizing film 10 is provided outside (on the opposite side to the visible side of) the first substrate 1 and a light absorbing film 11 is provided outside the reflection-type polarizing film 10 to form the liquid crystal display device (panel).

The absorption-type polarizing film 8 is a polarizing film or sheet which transmits the light linearly polarized in the direction parallel to the transmission axis thereof and absorbs the light linearly polarized in the direction orthogonal to the transmission axis thereof.

The absorption-type polarizing film 8 is a commonly used polarizing film which is made by a stretched film being dyed with iodine or a dichroic pigment.

The reflection-type polarizing film 10 is a polarizing film or sheet which transmits the light linearly polarized in the direction parallel to the transmission axis thereof and reflects the light linearly polarized in the direction orthogonal to the transmission axis thereof.

As the reflection-type polarizing film 10, which is made by thin films being formed on a transparent base film in multi-layered structure, for instance, Optical Film D-BEF (trade name) sold by Sumitomo 3M Co. Ltd. is used.

D-BEF is a product to be used typically for raising the luminance of a back light and serves sufficiently as the reflection-type polarizing film in the embodiment.

The retardation film 13 serves as a birefringence layer and a biaxial stretching film or a uniaxial stretching film can be used for the purpose.

In this embodiment, for improving the viewing angle characteristic, a biaxial retardation film having relations of nx>nz>ny, where nx is the refractive index in the direction of the phase delay axis (a stretching direction), ny is the refractive index in the Y-axis direction (a direction orthogonal to the direction of the phase-delay axis) and nz is the refractive index in the thickness direction, is used. Naturally, a uniaxial retardation film may be used.

However, the viewing angle characteristic is further improved by using a biaxial retardation film. Since incident light from all directions is utilized, this is preferable because a reflection-type liquid crystal display device becomes brighter.

The absorption-type polarizing film 8 is structured in such a manner that a transmission axis 8a shown in FIG. 3 is disposed at an angle of −70° with respect to the horizontal axis 30 (0°) and the retardation film 13 with the retardation value of 590 nm is disposed between the STN liquid crystal cell 16 and the absorption-type polarizing film 8, with a phase delay axis 13a thereof being at an angle of 50° with respect to the horizontal axis 30.

The reflection-type polarizing film 10 under the STN liquid crystal cell 16 is disposed in such a manner that a transmission axis 10a shown in FIG. 2 is at an angle of 75° with respect to the horizontal axis 30. Under the reflection-type polarizing film 10, disposed is a sheet of red paper as the light absorbing film 11.

The STN liquid crystal cell 16 and the reflection-type polarizing film 10 are adhered to each other with acrylic adhesives. The absorption-type polarizing film 8, the retardation film 13 and the STN liquid crystal cell 16 are also adhered to each other with acrylic adhesives.

As the absorption-type polarizing film 8, a common one to which no diffusion surface treatment is performed is used. Accordingly, a display in which the surface reflects light like a mirror and in which the metallic appearance is emphasized can be obtained.

Hereinafter, the mechanism of a monochromatic color display by the liquid crystal display device of the first embodiment will be explained with reference to FIG. 4.

Figure 4:
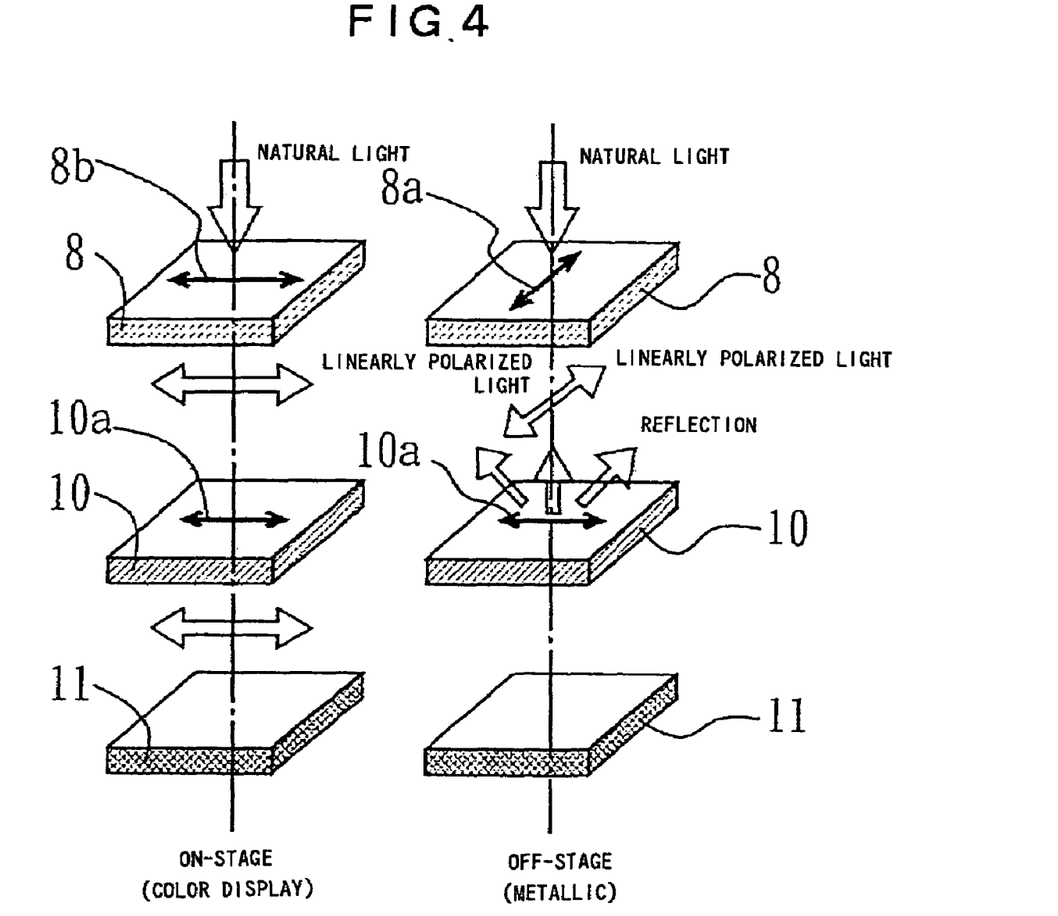
FIG. 4 is an explanatory perspective view for explaining a coloring mechanism of the liquid crystal display device in a first embodiment.

The right in FIG. 4 shows an "off-state" in which voltage is not applied across the first and second electrodes 3 and 4 of the STN liquid crystal cell 16, and the left shows an "on-state" in which voltage is applied respectively.

Out of the natural light incident from the upper side (visible side) onto the liquid crystal display device in FIG. 4, only the light linearly polarized in the direction parallel to the transmission axis 8a of the absorption-type polarizing film 8 passes through the absorption-type polarizing film 8. The light linearly polarized in the direction parallel to an absorbing axis 8b orthogonal to the transmission axis 8a is absorbed in the absorption-type polarizing film 8.

The linearly polarized light passed through the absorption-type polarizing film 8 reaches the retardation film 13 and is affected by a birefringence action while it passes through the retardation film 13 to be in an elliptically polarized state.

When the STN liquid crystal cell 16 is in an off-state (the right in FIG. 4), the elliptically polarized light is compensated during passage through the STN liquid crystal cell 16 to be a substantially linearly polarized light, and is rotated about 55° with respect to the transmission axis 8a of the absorption-type polarizing film 8 to emit from the position at −15° with respect to the horizontal axis 30 in FIG. 3.

The reflection-type polarizing film 10 is disposed in such a manner that the transmission axis 10a thereof is in the direction of 75° counterclockwise with respect to the horizontal axis 30 as shown in FIG. 2. Accordingly, the linearly polarized light passed through the STN liquid crystal cell 16, of which the direction of the polarization is in the direction twisted by 90° (orthogonal) with respect to the transmission axis 10a of the reflection-type polarizing film 10, is thus all reflected by the reflection-type polarizing film 10. The reflected light passes back to emit to the visible side, therefore the background becomes metallic silver.

On the other hand, in an on-state (the left in FIG. 4) where voltage is applied across the first electrode 3 and the second electrode 4 of the STN liquid crystal cell 16, molecules of the nematic liquid crystal 6 rise, the birefringence of the STN liquid crystal cell 16 changes, the linearly polarized light passing through the STN liquid crystal cell 16 rotates about 90° to be in the direction of 75° counterclockwise with respect to the horizontal axis 30 in FIG. 2.

Accordingly, the linearly polarized light incident onto the reflection-type polarizing film 10, of which the direction of the polarization becomes parallel to the transmission axis 10a of the reflection-type polarizing film 10, thus all passes through the reflection-type polarizing film 10 and is absorbed in the light absorbing film 11. A sheet of red paper is used as the light absorbing film 11, therefore red light is reflected and passes back to emit to the visible side. Thus a red display can be obtained.

As described above, according to this liquid crystal display device, information with letters and figures can be displayed in color on a metallic silver background, and enough contrast and an excellent viewing angle characteristic can be obtained. Moreover, the STN liquid crystal cell is used as a liquid crystal cell, thereby the nematic liquid crystal molecules sharply change in accordance with the applied voltage and so the shapeness in the optical characteristic can be improved.

Thus, the number of scanning lines can be increased up to 100 to 400 lines even in a scanning by simple-matrix driving, accordingly, a large-scale liquid crystal display device and a high-density liquid crystal display device can be provided. The viewing angle characteristic is also improved.

Modification of the First Embodiment

In the aforesaid first embodiment, the use of red paper as the light absorbing film 11 results in the liquid crystal display device to perform a red display on a metallic silver background. The color tone of the liquid crystal cell in the on-state can be optionally changed by changing the material of the light absorbing film 11.

For example, the use of a black film as the light absorbing film 11 makes a black display, the use of a blue color filter makes a blue display, and the use of gold paper makes a gold display. Accordingly, information with letters, figures and the like can be displayed in a required color on the metallic silver background, and various designs can be realized.

In this embodiment, a metallic silver background is displayed in a state with no voltage applied and a color display in a state with application of voltage on the STN liquid crystal cell. If the reflection-type polarizing film 10 is disposed in a manner such that the transmission axis 10a thereof is rotated by 90° to be at an angle of −15° with respect to the horizontal axis 30 in FIG. 2, it is also possible that a color background is displayed in the state with no voltage applied and a metallic silver display in the state with application of voltage on the STN liquid crystal cell 16.

Furthermore, in this embodiment, an ordinary polarizing film in which stretched PVA (polyvinyl alcohol) is dyed with iodine and sandwiched between TAC (triacetyl cellulose) films is used as the absorption-type polarizing film 8. The use of a colored polarizing film in which stretched PVA is dyed with a dichromatic pigment and sandwiched between TAC films as the absorption-type polarizing film 8 enables the metallic silver background to be colored.

The liquid crystal display device in which letters and figures are displayed in red on a blue metallic background can be manufactured by replacing the absorption-type polarizing film 8 shown in FIG. 1 with a blue color polarizing film.

Moreover, in the first embodiment, while the STN liquid crystal cell twisted by 225° is used as the STN liquid crystal cell 16, the same effects can be obtained if the twisted angle of STN liquid crystal cell is in the range of 180° to 270°.

Furthermore, in the first embodiment, a single retardation film 13 is used for making the linearly polarized light which passed through the absorption-type polarizing film 8 be in an elliptically polarized state, and the use of a plurality of retardation films 13 enables more completely elliptically polarized state to be realized, and enables the quantity of light which is returned as the linearly polarized light and twisted by the STN liquid crystal cell 16 to be increased, so that a more vivid metallic silver background and color display can be obtained.

In this case, a plurality of retardation films may be disposed on one side of the STN liquid crystal cell 16 or may be disposed separately on both sides of the STN liquid crystal cell 16.

Figure 5:
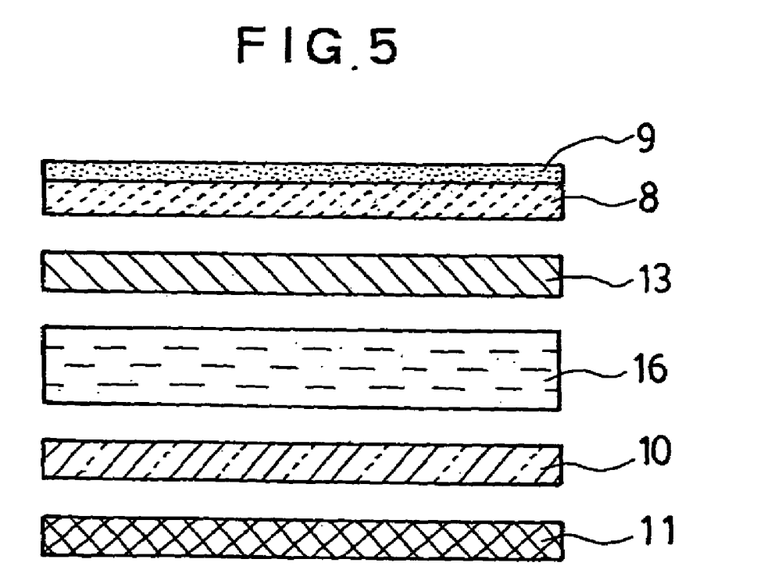
FIG. 5 to FIG. 10 are schematic cross-sectional views showing respective structures of a second embodiment to a seventh embodiment of the liquid crystal display device according to the present invention.

Second Embodiment: FIG. 5

FIG. 5 is a schematic sectional view showing a structure of the second embodiment of the liquid crystal display device according to the present invention. The same numerals are given to the same portions as those in FIG. 1 and so the descriptions thereof will be omitted. The structure of the STN liquid crystal cell 16 is the same as that of the first embodiment shown in FIG. 1 and so the drawing is simplified. The same situation and condition are applied to FIG. 6 through to FIG. 10 hereinafter.

The liquid crystal display device of the second embodiment differs from the liquid crystal display device shown in FIG. 1 only in that a light diffusion layer 9 is provided on the outside surface of the absorption-type polarizing film 8.

The light diffusion layer 9 is formed by applying or adhering a light diffusion agent on the surface of the absorption-type polarizing film 8.

By this light diffusion layer 9, the reflection on the surface is prevented and at the same time the light reflected by the reflection-type polarizing film 10 is diffused, so that a metallic silver color is seen, resembling frosted glass, to improve visibility of a display.

For example, when an absorption-type polarizing film of an anti-glare type in which silica particles as the light diffusion layer 9 are applied on the outside surface thereof is used as the absorption-type polarizing film 8, the metallic silver background becomes a soft display, resembling frosted glass.

As a scattering index of the light diffusion layer 9, a Heize value in the range of 30 to 90 is preferable, and a total light transmittance in the range of 80 to 90%, which is comparatively high, is preferable.

Figure 6:
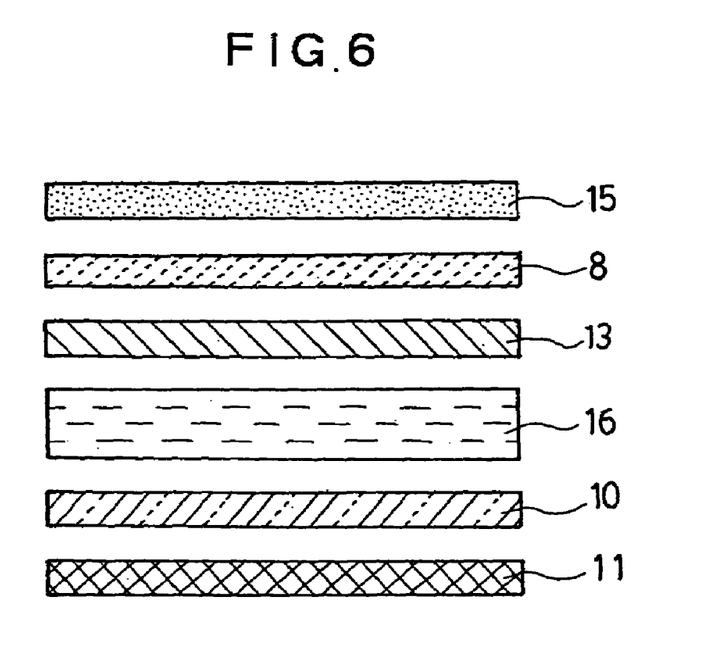

Third Embodiment: FIG. 6

FIG. 6 is a schematic sectional view showing a structure of the third embodiment of the liquid crystal display device according to the present invention, which differs from the aforesaid second embodiment only in that a light diffusion sheet 15 is provided outside the absorption-type polarizing film 8 in place of the light diffusion layer 9 in FIG. 5.

As the light diffusion sheet 15, used is a sheet in which, for example, adhesives mixed with acrylic beads is applied on a polycarbonate film. Alternatively, a sheet in which embossing is performed on the surface of a base film or light diffusion particles are dispersed in a base film may be used.

As a scattering index of the light diffusion sheet 15, a Heize value in the range of 30 to 90 is preferable, and a total light transmittance in the range of 80 to 90%, which is comparatively high, is preferable.

According to the embodiment, the metallic silver background becomes a soft display resembling frosted glass.

Figure 7:
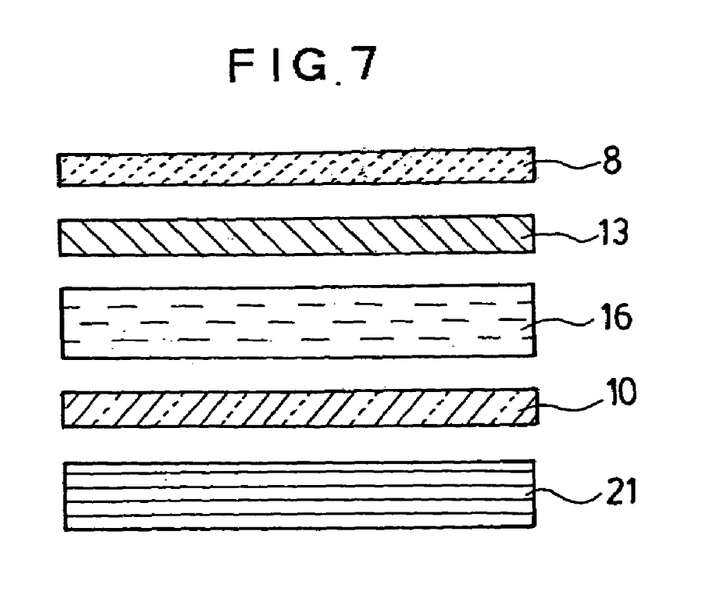

Fourth Embodiment: FIG. 7

FIG. 7 is a schematic sectional view showing a structure of the fourth embodiment of the liquid crystal display device according to the present invention which differs from the first embodiment shown in FIG. 1 only in that a solar cell 21 having a black surface is also used as a light absorbing member in place of the light absorbing film 11 made of colored paper.

The solar cell is a power source for driving an electronic machinery such as a watch which is provided with a liquid crystal display device as well as the liquid crystal display device itself and so is disposed under the reflection-type retardation film 10 of this liquid crystal display device, thereby driving the liquid crystal display without decreasing efficiency of power generation.

As proposed as the modification of the aforesaid first embodiment, the arrangement angle of the reflection-type retardation film 10 is rotated by 90° so that the background color is displayed in black and the information display portion in metallic silver, thereby about 35% or more of the incident light is absorbed by the solar cell 21 in the background portion, which allows the efficiency of power generation to be sufficient for a digital watch.

Figure 8:
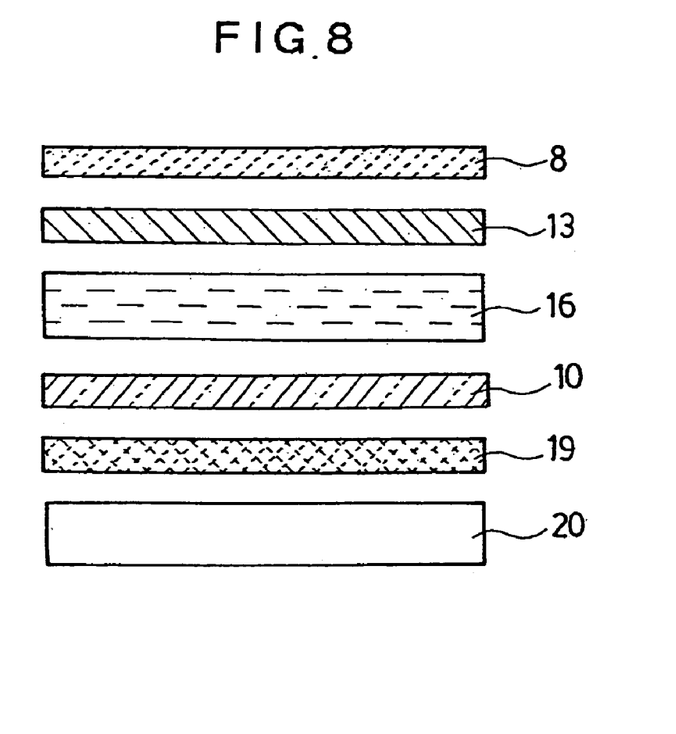

Fifth Embodiment: FIG. 8

FIG. 8 is a schematic sectional view showing a structure of the fifth embodiment of the liquid crystal display device according to the present invention, which differs from the first embodiment shown in FIG. 1 only in that a translucent absorbing film 19 is provided in place of the light absorbing film 11 made of colored paper and a back light 20 is disposed outside thereof.

Preferably, a color film is used as the translucent absorbing film 19 and an electro-luminescence (EL) light of a plane emitter type is used as the back light 20, and the combination of a light emitting diode (LED) array and a light guide plate or that of a fluorescent light and a light guide plate can be also employed.

The translucent absorbing film 19 and the back light 20 are provided as above, thereby the light passed through the reflection-type polarizing film 10 is absorbed in the translucent absorbing film 19 in a reflection-type display viewed by means of the outer daylight, so that letters and the like in excellent contrast with the metallic silver background caused by mirror reflection of the reflection-type polarizing film 10 can be displayed. When a color film is used for the translucent absorbing film 19, thereby letters and the like which are colored by the color film can be displayed on the metallic silver background.

In a dark place such as outdoors at night, the back light 20 is turned on, which enables a transparent-type monochromatic color display to be clearly performed.

The use of a blue transparent film for the translucent absorbing film 19 can creat a blue display, and an optional display color can be obtained by changing the color of the transparent film.

For example, a gold cholesteric liquid crystal polymer film is used for the translucent absorbing film 19, which enables a gold metallic display on the metallic silver background and a display with lighting by the back light 20 in the night.

It should be noted that a color film is used for the translucent absorbing film 19 in this embodiment, but when the EL light is used for the back light 20, and the surface thereof is printed in a transparent color, thereby the translucent absorbing film 19 can be omitted.

Figure 9:
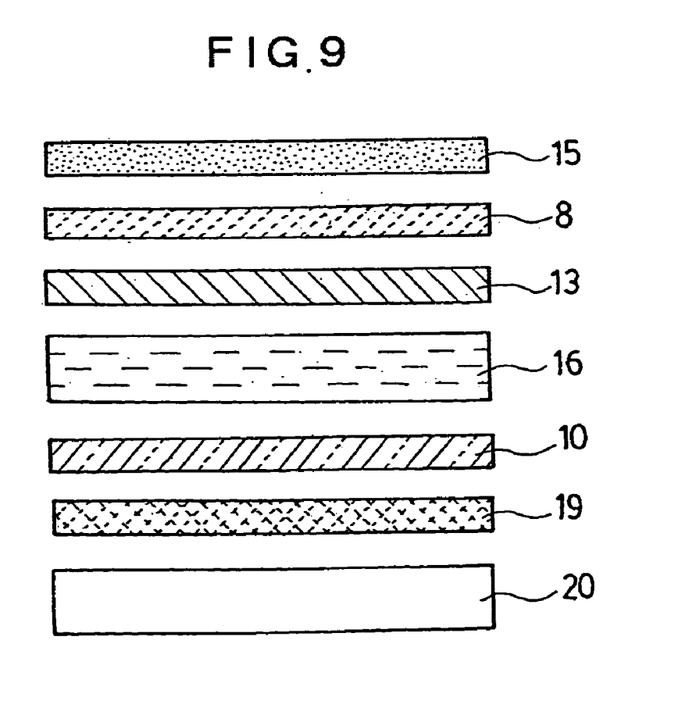

Sixth Embodiment: FIG. 9

FIG. 9 is a schematic sectional view showing a structure of the sixth embodiment of the liquid crystal display device according to the present invention. The same numerals are given to the same portions as those in FIGS. 6 and 8.

The sixth embodiment differs from the fifth embodiment shown in FIG. 8 only in that the light diffusion sheet 15 is provided outside the absorption-type polarizing film 8.

The examples, effects and the like of the light diffusion sheet 15 are the same as those in the third embodiment shown in FIG. 6, therefore the descriptions thereof are omitted.

Figure 10:
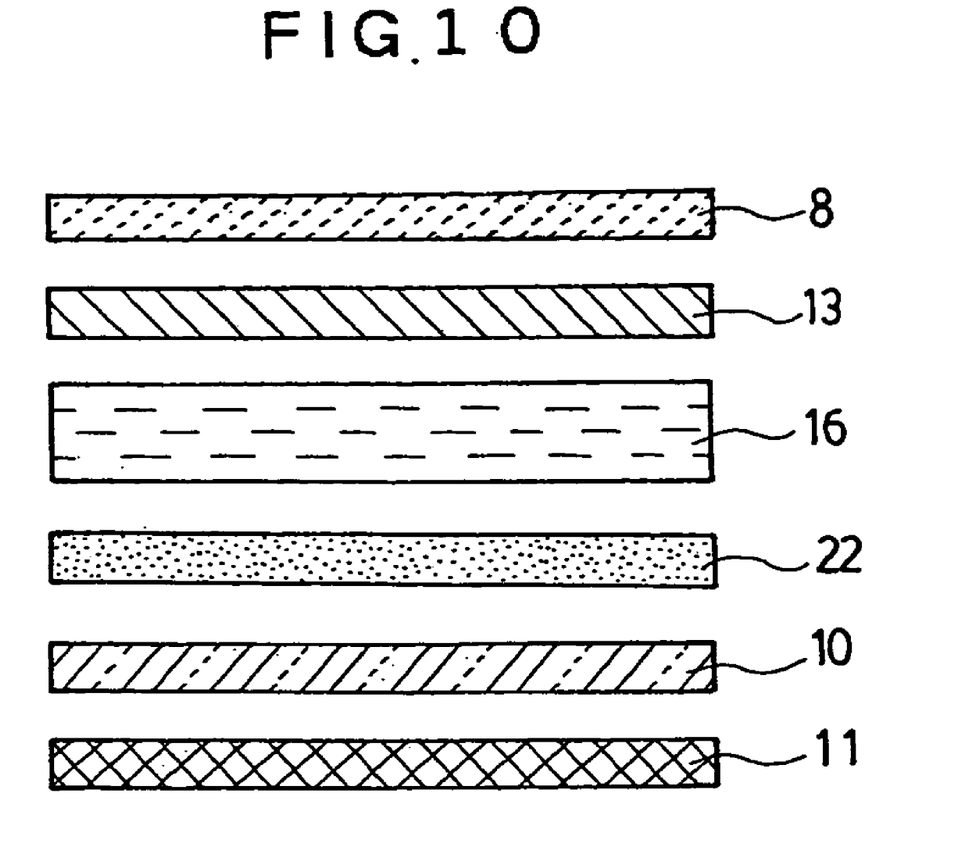

Seventh Embodiment: FIG. 10

FIG. 10 is a schematic sectional view showing a structure of the seventh embodiment of the liquid crystal display device according to the present invention. The same numerals are given to the same portions as those in FIG. 1.

The seventh embodiment differs from the first embodiment shown in FIG. 1 only in that a light diffusion layer 22 is provided between the first substrate 1 of the STN liquid crystal cell 16 and the reflection-type polarizing film 10.

The light diffusion layer 22 is disposed as described above, thereby a display of the metallic silver background also becomes soft, resembling frosted glass, so that the same effects as those in the liquid crystal display device of the second embodiment shown in FIG. 5 and the third embodiment shown in FIG. 6 can be obtained.

As the light diffusion layer 22, diffusion adhesives in which fine particles are dispersed in adhesives may be preferably applied on the lower face of the first substrate 1 of the STN liquid crystal cell 16 or the upper face of the reflection-type polarizing film 10.

Alternatively, the light diffusion sheet 15 may be used similarly to the third embodiment shown in FIG. 6. The various changes similar to those in the modifications of the first embodiment are possible in these embodiments.

Figure 11:
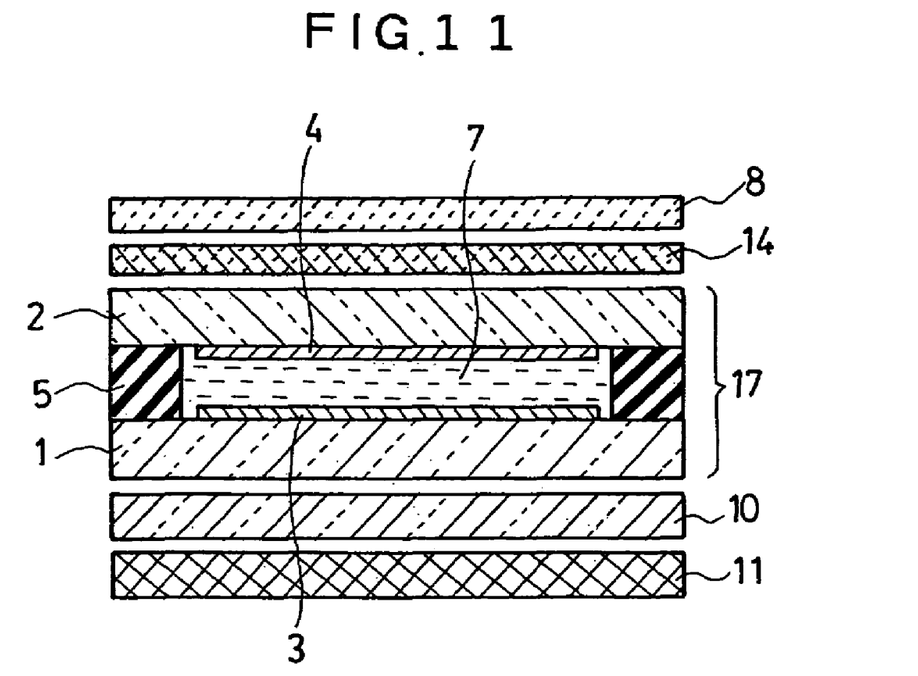
FIG. 11 is a schematic cross-sectional view showing a structure of a eighth embodiment of the liquid crystal display device according to the present invention.
Figure 12:
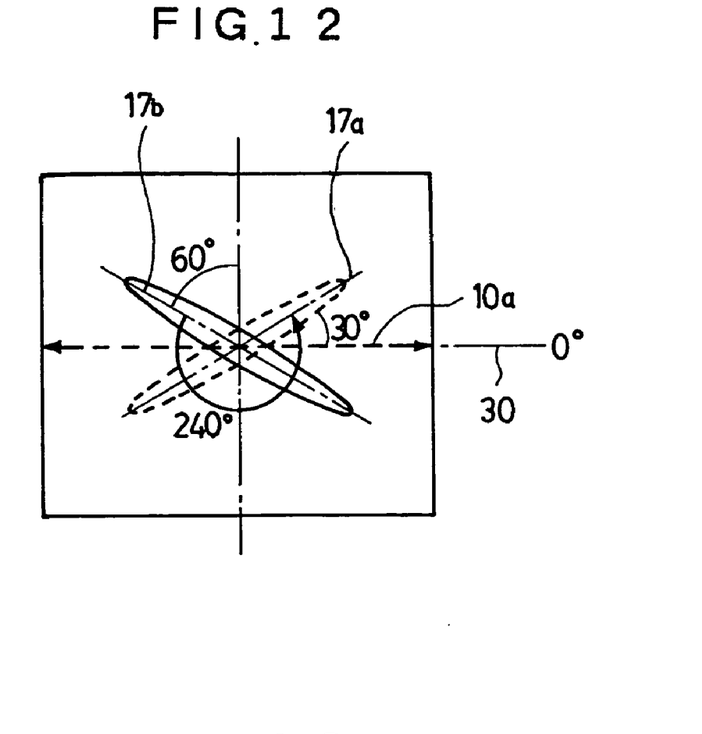
FIGS. 12 and 13 are plane views showing positional relations of axes of the liquid crystal display device in an eighth embodiment.
Figure 13:
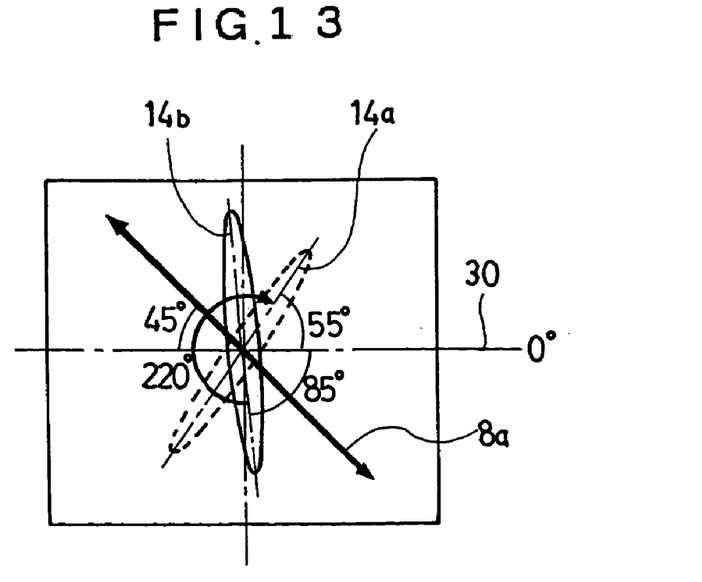
Figure 14:
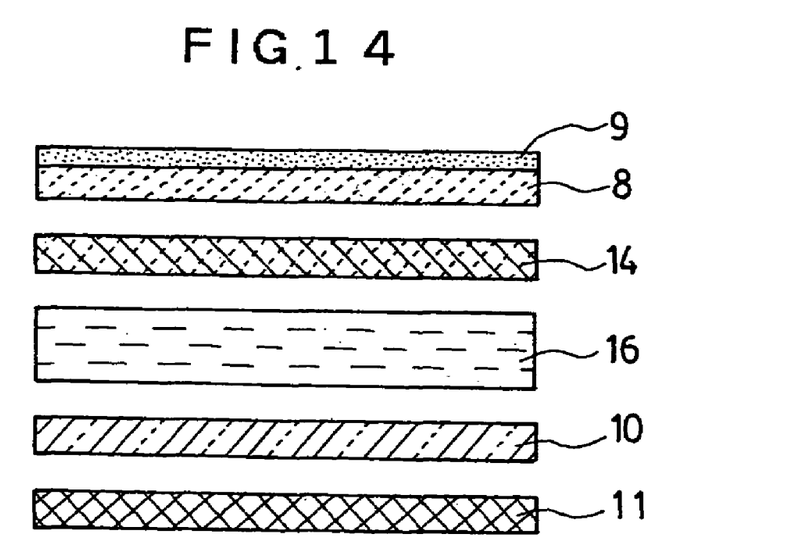
FIG. 14 to FIG. 19 are schematic cross-sectional views showing respective structures of a ninth embodiment to a fourteenth embodiment of the liquid crystal display device according to the present invention.
Figure 15:
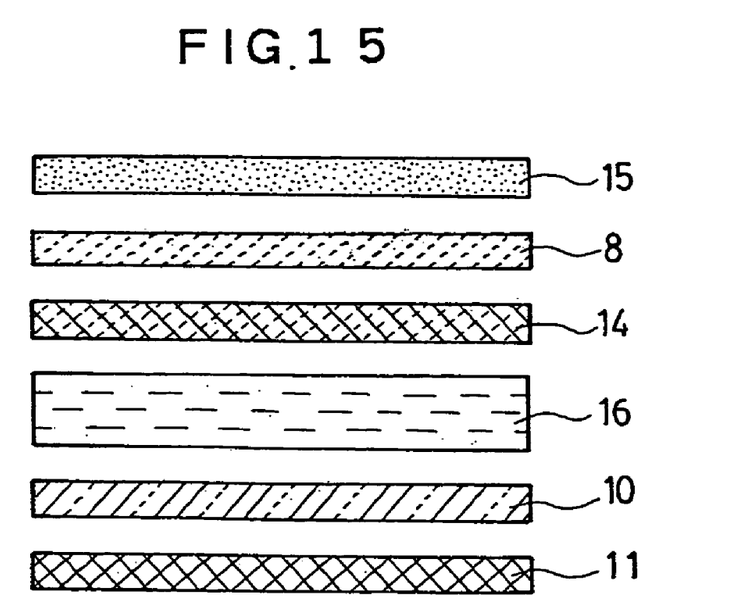
Figure 16:
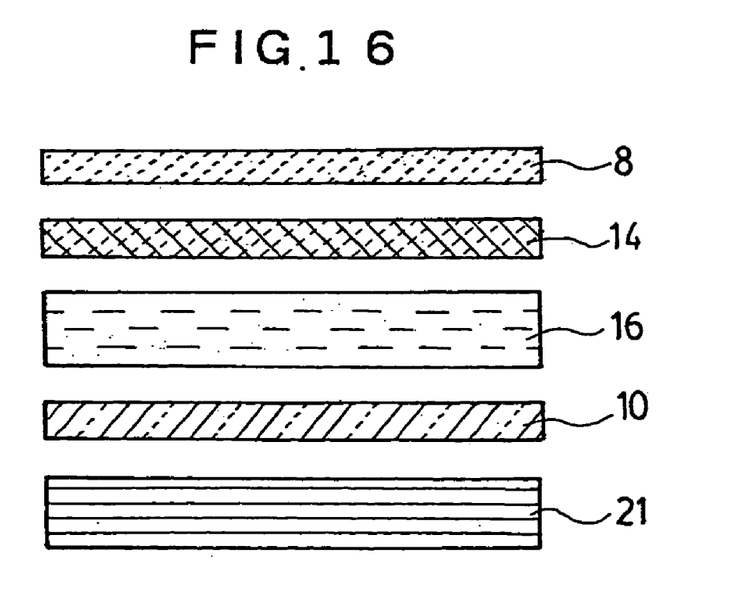
Figure 17:
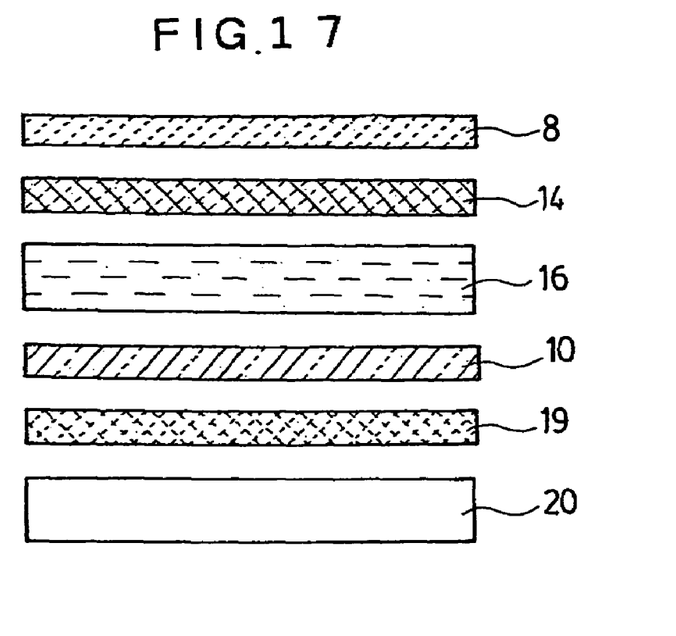
Figure 18:
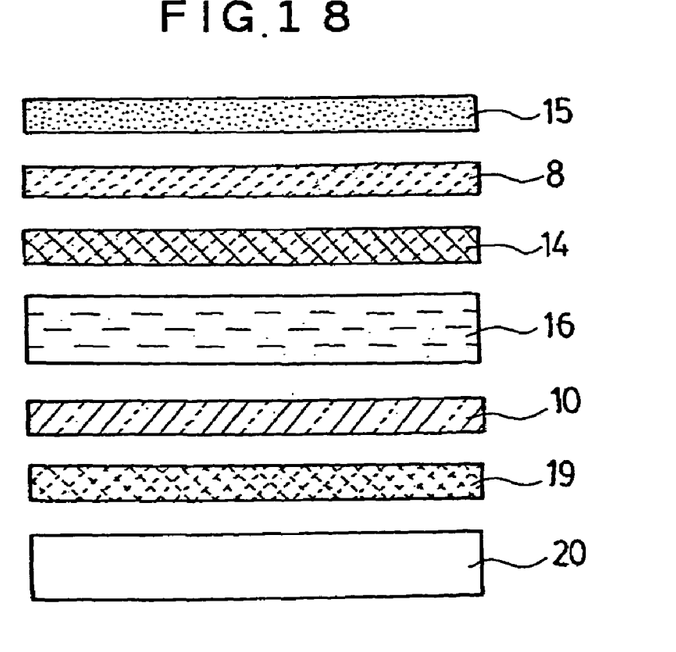
Figure 19:
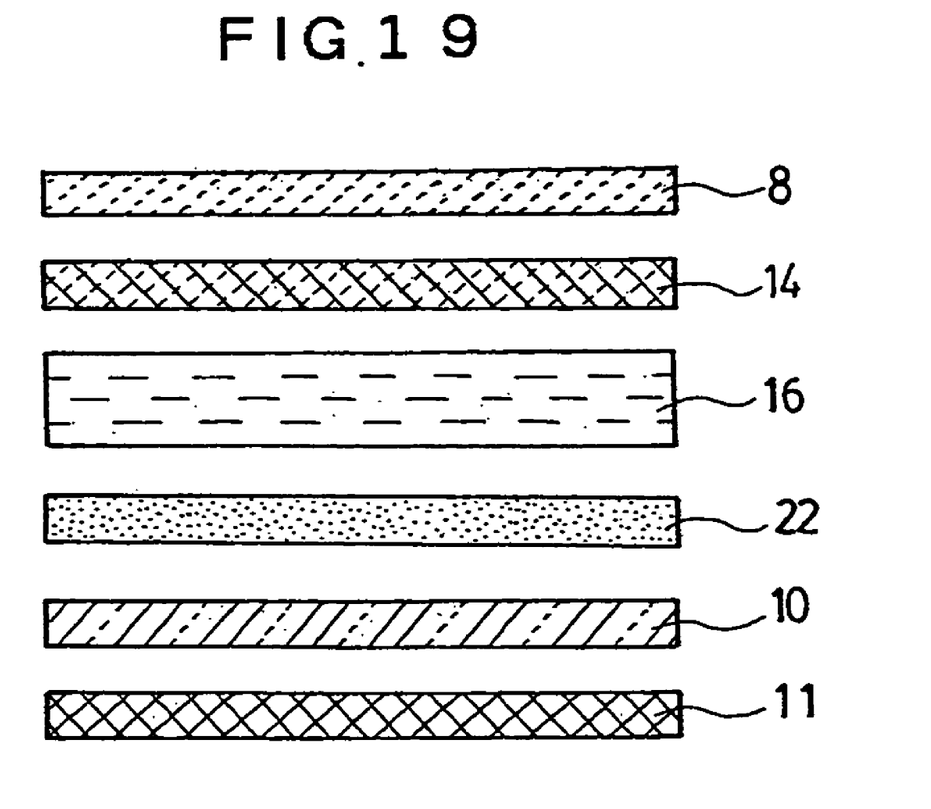

Eighth Embodiment: FIG. 11 to FIG. 13

Next, the eighth embodiment of the liquid crystal display device according to the present invention will be explained hereinafter with reference to FIG. 11 to FIG. 13.

FIG. 11 is a schematic view similar to FIG. 1 showing a structure of the liquid crystal display device of the eighth embodiment, and FIGS. 12 and 13 are plane views showing arrangement relations of each axis of components in the liquid crystal display device. In these drawings, the same numerals are given to the same portions as those in FIG. 1 to FIG. 3 and the descriptions thereof are omitted.

The liquid crystal display device of the eighth embodiment differs from the liquid crystal display device of the first embodiment only in that the twist angle of an STN liquid crystal cell 17 differs from that of the STN liquid crystal cell 16 and a twisted retardation film 14 is used in place of the retardation film 13 in FIG. 1.

In the STN liquid crystal cell 17 used for the liquid crystal display device of this embodiment, the nematic liquid crystal 7 which is filled and sandwiched in a gap between the first substrate 1 and the second substrate 2 is twistedly aligned at 240°.

More specifically, an alignment film is formed on the surfaces of the first electrode 3 and the second electrode 4, a rubbing treatment is performed so that a lower molecular alignment direction 17a of liquid crystal shown in FIG. 12 is disposed in the direction at an angle of 30° counterclockwise with respect to the horizontal axis 30 (0°) on the first substrate 1 side, and a rubbing treatment is performed so that an upper molecular alignment direction 17b of liquid crystal is disposed in the direction at an angle of 300 clockwise with respect to the horizontal axis 30 (0°) on the second substrate 2 side. Through the above structure, formed is the STN liquid crystal cell 17 in which the twisted alignment angle of the nematic liquid crystal 7 is 240° counterclockwise seen from the second substrate 2 side.

A difference Δn in birefringence of the nematic liquid crystal 7 used for the STN liquid crystal cell 17 is set to be 0.15 and a cell gap d which is a gap between the first substrate 1 and the second substrate 2 is set to be 5.4 μm. Accordingly, a Δnd value of the STN liquid crystal cell 17 which is represented by the product of the difference Δn in the birefringence of the nematic liquid crystal 7 and the cell gap d is 810 nm. A twisted pitch of the nematic liquid crystal 7 is adjusted to 11 μm.

The absorption-type polarizing film 8 is disposed in such a manner that the transmission axis 8a is disposed in the direction of −45° with respect to the horizontal axis 30 (0°) as shown in FIG. 13. Furthermore, the twisted retardation film 14 having a Δnd of 620 nm and being twisted at 220° right is provided between the STN liquid crystal cell 17 and the absorption-type polarizing film 8. A lower polymer molecular alignment direction 14a of the twisted retardation film 14 on the second substrate 2 side shown in FIG. 13 is disposed in the direction of 55° counterclockwise with respect to the horizontal axis 30, and an upper polymer molecular alignment direction 14b of the twisted retardation film 14 on the absorption-type polarizing film 8 side shown in FIG. 13 is disposed at an angle of 850 clockwise with respect to the horizontal axis 30. The reflection-type polarizing film 10 is disposed under the STN liquid crystal cell 17 in such a manner that the transmission axis 10a shown in FIG. 12 is parallel to the horizontal axis 30. Moreover, under the reflection-type polarizing film 10, disposed is the light absorbing member 11 such as a sheet of colored paper.

As the twisted retardation film 14, it is preferable to use a liquid crystal polymer film in which an alignment treatment is performed to a TAC (triacetyl cellulose) film with 80 μm in thickness, the film is coated with liquid polymer and is cured by quickly cooling after adjustment so as to be at a required twisted condition at high temperatures of 100° C. or more.

The twisted retardation film 14 has a twist in the reverse direction to the twist direction of the STN liquid crystal cell 17 compared with the ordinary retardation film used in the aforesaid embodiments, so the birefringence occurred in the STN liquid crystal cell 17 can be completely compensated.

The components shown in FIG. 11 are adhered to each other with acrylic adhesives. Other structures are the same as those in the aforesaid first embodiment.

In a state with no voltage applied on the STN liquid crystal cell 17, the light linearly polarized in the direction parallel to the transmission axis 8a which is incident from the absorption-type polarizing film 8 assumes an elliptically polarized state after passing through the STN liquid crystal cell 17 in the case of no twisted retardation film 14, thereby it is unnecessarily colored by the reflection-type polarizing film 10 or can not pass through as a completely linearly polarized light, and there is a possibility that the display becomes insufficient in quality.

However, the twisted retardation film 14 is disposed between the absorption-type polarizing film 8 and the STN liquid crystal cell 17, so that the linearly polarized light incident through the absorption-type polarizing film 8 into the twisted retardation film 14 assumes an elliptically polarized state.

The elliptically polarized light is compensated while passing through the STN liquid crystal cell 17 to become a substantially completely linearly polarized light, rotates right about 45° clockwise with respect to the transmission axis 8a of the absorption-type polarizing film 8, and emits from the position at 90° with respect to the horizontal axis 30 in FIG. 13.

The transmission axis 10a of the reflection-type polarizing film 10 is disposed, as shown in FIG. 12, parallel to the horizontal axis 30, so that the light linearly polarized in the direction orthogonal to the transmission axis 10a reaches the reflection-type polarizing film 10. Accordingly, as shown in the off-state in FIG. 4, the whole incident light is reflected by the reflection-type polarizing film 10, which appears as a metallic silver background.

In an on-state when voltage is applied across the first electrode 3 and the second electrode 4 of the STN liquid crystal cell 17, molecules of the nematic liquid crystal 7 rise, the birefringence of the STN liquid crystal cell 17 changes, and the emitting linearly polarized light rotates about 90° to be in the direction parallel to the horizontal axis 30.

Accordingly, the linearly polarized light passed through the STN liquid crystal cell 17 reaches the reflection-type polarizing film 10, parallel to the transmission axis 10a thereof, and therefore all passes through the reflection-type polarizing film 10 and is absorbed in the light absorbing film 11. If the color tone of the light absorbing film 11 is blue, blue light is reflected, thereby the display can be seen as a blue color.

Therefore, blue letters and figures are displayed in high contrast on the metallic silver background.

The liquid crystal display device is applied to, for example, a display portion of a fashion digital watch, which can provide a quite colorful digital watch in combination with a case or a band.

The various changes described as the modifications of the first embodiment are similarly possible in the eighth embodiment.

Ninth Embodiment to Fourteenth Embodiment:
FIG. 14 to FIG. 19

FIG. 14 to FIG. 19 are schematic views similar to FIG. 5 to FIG. 10 showing the ninth embodiment to the fourteenth embodiment of the liquid crystal display device according to the present invention respectively.

In each embodiment, the liquid crystal display device using the STN liquid crystal cell 17 and the twisted retardation film 14 similar to those in the eighth embodiment shown in FIG. 11 has an additional configuration similar to that in the second embodiment to the seventh embodiment shown in FIG. 5 to FIG. 10 respectively.

These configurations and effects are the same as those of the second embodiment to the seventh embodiment shown in FIG. 5 to FIG. 10, except the differences from those of the first embodiment shown in FIG. 1 and the eighth embodiment shown in FIG. 11, therefore the descriptions thereof are omitted.

The various changes described as the modifications of the first embodiment are similarly possible in these embodiments.

INDUSTRIAL APPLICABILITY

As it is obvious from the aforesaid description, in the liquid crystal display device according to the present invention, display of information with letters and figures in black or an optional color on a metallic silver background can be performed with high contrast, and thereby a monochromatic color display with an excellent visible angle characteristic and richness in designs is possible.

As a result, the liquid crystal display device can be used as a display device in various electronic devices including a portable electronic devices such as a wrist watch, a portable telephone or the like, and increases the visibility thereof. Moreover, it can provide colorful electronic devices rich in designs.

What is claimed is:

1. A liquid crystal display device, comprising:
    a super twisted nematic liquid crystal cell in which nematic liquid crystal having a twist angle in the range from 180° to 270° is filled and sandwiched between a transparent first substrate having a first electrode and a transparent second substrate having a second electrode;
    a twisted retardation film provided outside said second substrate;
    the twist angle and the Δnd value of the twisted retardation film are smaller than that of the super twisted nematic liquid crystal cell;
    an absorption-type polarizing film provided outside the twisted retardation film for absorbing light linearly polarized in the direction orthogonal to the transmission axis thereof;
    a reflection-type polarizing film having a transmission axis and a reflection axis in a direction orthogonal to the transmission axis, provided outside said first substrate for transmitting light linearly polarized in a direction parallel to the transmission axis and reflecting light linearly polarized in the direction parallel to the reflection axis; and
    a light absorbing member provided outside the reflection-type polarizing film,
    wherein said twisted retardation film and said reflection-type polarizing film constitute reflection light increasing means which increases intensity of reflected light which is transmitted from a visible side of said super twisted nematic liquid crystal cell and reflected to the visible side by said reflection-type polarizing film in which light changed into elliptically polarized light when transmitted through said absorption-type polarizing film and said twisted retardation film from the visible side is set to return to substantially linearly polarized light and outputted after further transmitted through said upper twisted nematic liquid crystal cell to increase brightness of said reflected light in a state no voltage is applied to the liquid crystal cell, while the light enables the color of said light absorbing member to be visible in a state voltage is applied to the liquid crystal cell.

2. The liquid crystal display device according to claim 1, wherein a light diffusion layer is provided on the outside surface of said absorption-type polarizing film.

3. The liquid crystal display device according to claim 1, wherein a light diffusion sheet is provided outside said absorption-type polarizing film.

4. The liquid crystal display device according to claim 1, wherein said absorption-type polarizing film is a color polarizing film using a dichromatic pigment.

5. The liquid crystal display device according to claim 1, wherein said light absorbing member is a color filter.

6. The liquid crystal display device according to claim 1, wherein said light absorbing member is a solar cell.

7. The liquid crystal display device according to claim 1, wherein said light absorbing member is a translucent absorbing member and a back light is provided outside the translucent absorbing member.

8. The liquid crystal display device according to claim 1, wherein a light diffusion layer is provided between said first substrate of the liquid crystal cell and said reflection-type polarizing film.

* * * * *